United States Patent [19]

Schiel et al.

[11] Patent Number: 5,044,161

[45] Date of Patent: Sep. 3, 1991

[54] DUAL EXTERNAL PIN RESERVOIR VALVES FOR TANDEM MASTER CYLINDER ASSEMBLY

[75] Inventors: Lothar Schiel, Hofheim; Juergen Bauer, Wiesbaden, both of Fed. Rep. of Germany

[73] Assignee: Alfred Teves GmbH, Frankfurt am Main, Fed. Rep. of Germany

[21] Appl. No.: 482,377

[22] Filed: Feb. 20, 1990

[30] Foreign Application Priority Data

Feb. 25, 1989 [DE] Fed. Rep. of Germany ....... 3905917

[51] Int. Cl.⁵ .......................... B60T 11/20; B60T 8/44; F15B 7/08
[52] U.S. Cl. ........................ 60/589; 60/562; 92/170.1; 92/171.1
[58] Field of Search ............ 60/562, 581, 589; 92/165 R, 170.1, 171.1

[56] References Cited

U.S. PATENT DOCUMENTS

| 3,470,695 | 10/1969 | Kilb | 60/562 X |
|---|---|---|---|
| 4,474,005 | 10/1984 | Steer | 60/562 |
| 4,559,781 | 12/1985 | Steer et al. | 60/589 X |
| 4,685,299 | 8/1987 | Myers et al. | 60/562 X |
| 4,693,083 | 9/1987 | Reinartz | 60/562 X |
| 4,745,751 | 5/1988 | Gaiser | 60/589 X |
| 4,887,517 | 12/1989 | Shinohara | 92/171.1 |
| 4,951,470 | 8/1990 | Reinartz et al. | 60/562 |

FOREIGN PATENT DOCUMENTS

| 2335530 | 11/1982 | Fed. Rep. of Germany . |
|---|---|---|
| 3431115 | 3/1986 | Fed. Rep. of Germany ........ 60/589 |

Primary Examiner—Edward K. Look
Assistant Examiner—George Kapsalas
Attorney, Agent, or Firm—Robert P. Seitter; J. Gordon Lewis

[57] ABSTRACT

A tandem master cylinder in which the primary piston and the secondary piston are configured in the shape of plunger pistons which are captivated to each other in the longitudinal bore of the cylinder housing. A cylindrical bushing is provided in the housing longitudinal bore and accommodates sealing cups sealing off the two pistons. The two valves which control hydraulic fluid flow are actuatable independently of each other.

37 Claims, 6 Drawing Sheets

DUAL EXTERNAL PIN RESERVOIR VALVES FOR TANDEM MASTER CYLINDER ASSEMBLY

BACKGROUND OF THE INVENTION

1. Field of Invention

The present invention relates to a tandem master cylinder for hydraulic brake systems, the housing of which is securable to a booster housing of a preceding brake power booster. This tandem master cylinder has a primary piston prestressed by a return spring as well as a secondary piston which define, within a longitudinal bore, primary and secondary pressure chambers which in the release position are in connection with a supply tank through tank connections and hydraulic fluid ducts in the housing and being released, respectively, shut off by means of two valves which are actuatable by the primary piston.

2. Description of the Prior Art

A tandem master cylinder of this kind is known from German patent specification No. 23 35 530. A particular feature of this prior-art tandem master cylinder is that the valves disposed in the connection between the pressure chambers and the supply tank are actuated by a push rod which is guided within a bore extending parallel to the longitudinal bore of the tandem master cylinder and which is connected to the primary piston through a travel booster exclusively actuatable by the primary piston and has its fixed point at the housing such that in the event of actuation of the primary piston in the operating direction, the valves are closed in that the push rod is shifted by a distance which is greater than and proportional to the travel of the primary piston in respect of the housing.

In the state-of-the-art tandem master cylinder, the precision machining of the longitudinal bore and of the surfaces of the two pistons, on one hand, as well as of the bore accommodating the push rod, on the other hand, which is required for smooth operation of the tandem master cylinder and which involves heavy manufacturing cost must be regarded as disadvantageous.

The fact that the two pistons do not permit exact positioning relative to each other since the subdivision of their travel exclusively depends on the return springs by which they are prestressed is, furthermore, felt to be a disadvantage.

Another disadvantage is that the individual closing travels of the two valves which are determined by the tolerances are not adjustable, and that it is not possible to pre-assemble a plurality of components in order to optimize the assembly costs.

SUMMARY OF THE INVENTION

It is, therefore, the object of the present invention to provide a tandem master cylinder which jointly with an increase in the reliability in operation makes it possible to greatly reduce the manufacturing and assembly costs and which is distinguished by but a small overall length. In addition, this tandem master cylinder is adaptable for use, without problems, in brake systems furnished with anti-locking devices.

According to the present invention, this object is achieved by arranging the primary piston as well as the secondary piston in the shape of plunger pistons which are captivated to each other. Also, a cylindrical bushing is arranged in the longitudinal bore which accommodates sealing cups sealing off the two pistons. The two valves are actuatable independently of each other.

To achieve the foregoing, the pistons are captivated by means of an adjustment bushing which is coupled to the primary piston and which interacts with a stop disposed at the secondary piston. The adjustment bushing is screwed into the primary piston and serves as a support for a compression spring which takes support at the secondary piston. The stop may preferably be formed by an axially adjustable disc which is screwed onto a pin fastened to the secondary piston. This permits preassembly of the two pistons so as to form one assembly, and simultaneously adjustment of the distance between each other and of the spring power of the compression spring which prestresses the secondary piston.

In accordance with one aspect of the present invention which results in a particularly compact design, the bushing strikes within the housing and is retained axially by means of a clamping sleeve which is screwed onto the housing and is preferably formed with an annular surface extending in the radial direction and serves as a support for the return spring of the primary piston which is arranged outside the longitudinal bore. In this configuration, the valves are arranged separately within bores extending parallel to the axis of the longitudinal bore and each is formed by a screw-in valve assembly in which a first valve cup, a second valve cup as well as an intermediate element interposed between the valve cups are positioned. The valve closing member is constituted by a hemispherically configured end of an actuating pin guided in the screw-in valve assembly in the intermediate element, which end interacts with the first valve cup.

In accordance with another aspect of the present invention, in order to allow adjusting the closing travels of the two valves individually from the outside, the actuating pins are axially adjustably coupled to a spring retainer which is coupled to the primary piston and at which the return spring takes support. The spring retainer is formed with an axial extension which is screwed into the primary piston and which serves to adjust the initial stress of the return spring of the primary piston.

In a further advantageous embodiment of the present invention, a particularly simple design fastening of the tandem master cylinder to the booster housing is achieved in that the bushing is screwed into the housing and presents a circumferential recess as well as a radial annular surface in the fixing range of the booster housing. The recess accommodates an axial collar which is configured at the booster housing and the annular surface is in abutment in the axial direction against the booster housing, on one side, and serves as an abutment surface for the return spring, on the other side.

BRIEF DESCRIPTION OF THE DRAWINGS

Further features and advantages of the present invention will be disclosed by the description of three embodiments made with reference to the accompanying drawings, in which.

DETAILED DESCRIPTION OF THE INVENTION

Figure 1:
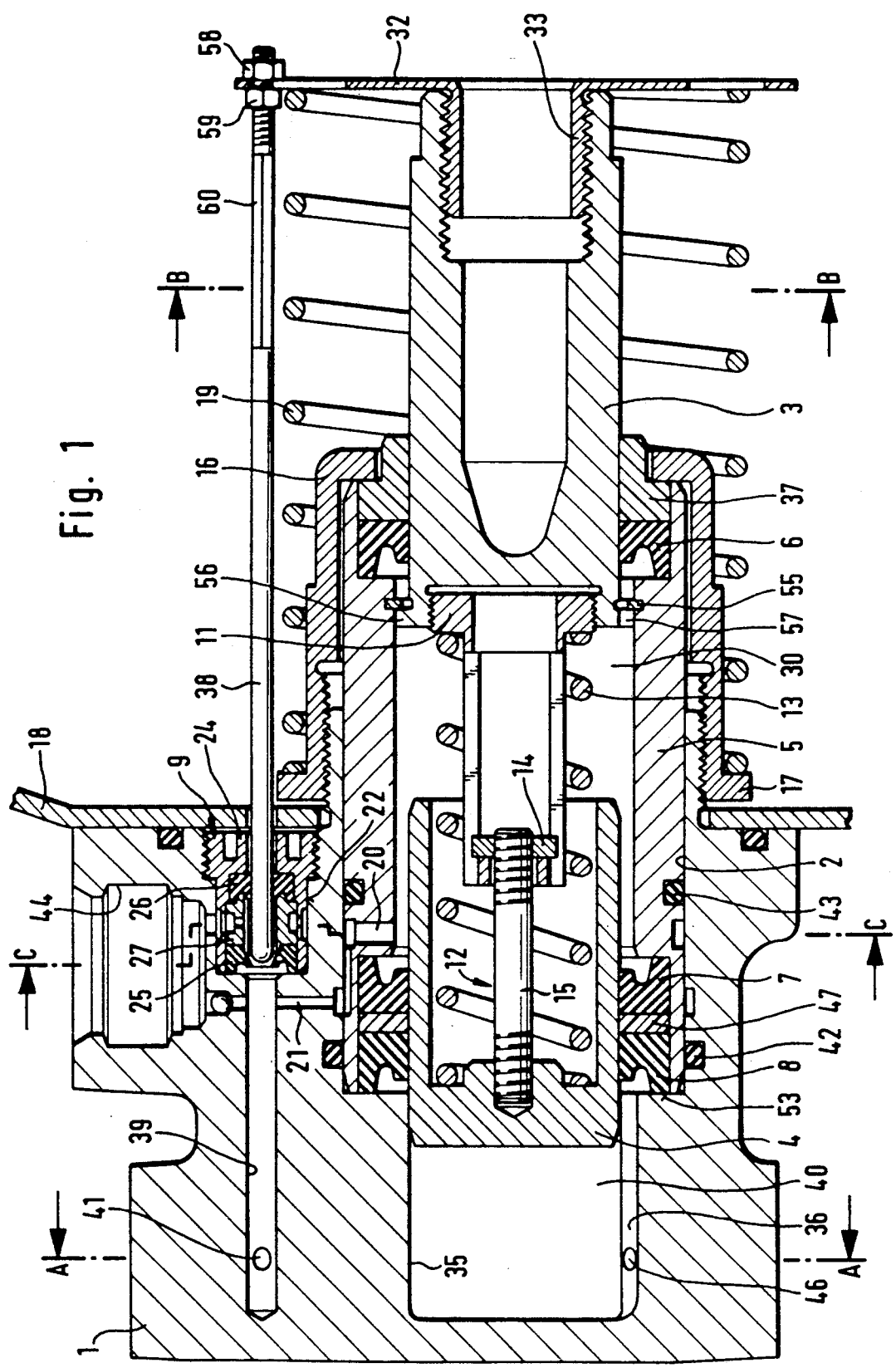
FIG. 1 shows an axial section of the tandem master cylinder according to the present invention.

The tandem master cylinder according to the present invention shown in FIGS. 1 and 4 to 7 is comprised of a housing 1 within whose longitudinal bore 2 a primary piston 3 and a secondary piston 4 define a primary pressure chamber 30 and a secondary pressure chamber 40. The primary pressure chamber 30 is bounded by the wall of a bushing 5 which is fitted into the longitudinal bore 2 and is sealed off in respect of the housing 1 by means of two sealing rings 42, 43 which are inserted in circumferential grooves in the housing 1 and in the bushing 5, respectively. The bushing 5 is retained in axial direction by a clamping sleeve 16 which is screwed onto the housing 1 and abuts against a stop 53 in the housing 1. Bushing 5 is arranged to accommodate upright sealing cups 6, 7 and 8. Sealing cup 6 seals off the primary pressure chamber 30 in respect of the atmosphere. Sealing cup 7 seals the primary pressure chamber 30 in respect of the secondary pressure chamber 40. Sealing cup 8 seals the secondary pressure chamber 40 in respect of the primary pressure chamber 30. In this context, a radial flange 56 is provided on the primary piston 3 which renders possible the latter to be guided axially in the bushing 5 and which is furnished with a plurality of circumferential grooves 57 enabling the hydraulic fluid enclosed in the primary pressure chamber 30 to pass over to the first sealing cup 6. In the release position, the flange 56 is in abutment against a stop fixed with respect to the housing 1 and formed in the illustrated embodiment by a circlip 55 which is inserted in the wall of the bushing 5. A guide bushing 37, which is fitted into the bushing 5 and retains the first sealing cup 6, is retained in axial direction by the clamping sleeve 16 and provides additional guidance to the primary piston 3.

The two master cylinder pistons 3 and 4, being preferably configured in the shape of plunger pistons, are captivated to each other by means of an adjustment sleeve 11 which is screwed into a recess of the primary piston 3. The adjustment sleeve 11 interacts with a stop 12 which is connected with the secondary piston 4 and is formed by a pin 15 being screwed into the secondary piston 4 and by a disc 14 being screwed onto pin 15. This arrangement offers the possibility of an exact adjustment of the axial distance between the primary piston 3 and the secondary piston 4 as well as of the prestress of a compression spring 13 which is held between the two pistons 3, 4.

In the region of the stop 53, the longitudinal bore 2 passes over into a section 35 of smaller diameter which bounds the secondary pressure chamber 40 and whose wall serves as a guide for the secondary piston 4. The secondary piston 4 is guided, in addition, by a reinforcement disc 47 which is disposed between the sealing cups 7 and 8. In the wall of the section 35, a channel 36 having a circular segment-shaped cross section is configured (see, in particular, FIG. 5) which has two hydraulic fluid discharge branches 45, 46 associated with the secondary pressure chamber 40.

In order to supply hydraulic fluid to the two pressure chambers 30, 40, a supply tank, not shown in detail in the drawing, is utilized which is connected with the primary pressure chamber 30 and with the secondary pressure chamber 40 through tank connections 34 and 44 (FIG. 4) in the housing 1 as well as through hydraulic fluid ducts 21, 68 and a radial bore 20 in the bushing 5 which lead through two axial passages 29, 39 from two bores 22, 23. Two first hydraulic fluid discharge branches 31, 41 (FIG. 5) are connected to the passage 39 which is associated with the primary pressure chamber 30. The passage 29, which is associated with the secondary pressure chamber 40, is connected with the secondary pressure chamber 40 by means of the above-mentioned hydraulic fluid duct 68. Two valves 9, 10 (FIG. 7), being actuatable by the primary piston 3, are arranged within the bores 22, 23 and extend parallel to the axis of the longitudinal bore 2 in the housing 1. Each of the two valves 9, 10 is comprised of a screw-in valve assembly 24 being screwable into the housing 1 and accommodating two valve cups 25 and 26, an intermediate element 27 interposed between the valve cups 25, 26, and the end of an actuating pin 28, 38 (FIGS. 4 and 8) as a valve closing member. The two actuating pins 28, 38 are provided at their other end with a thread not shown in detail in the drawing and are screwed up to a spring retainer 32 which is coupled to the primary piston 3 and at which a return spring 19 is supported which biases the primary piston 3. The other end of spring 19 is in abutment against an annular surface 17 being configured at the clamping sleeve 16. The actuating pins 28, 38 are furnished with hexagons 60 in their region of fixation at the spring retainer 32 in order to grip the actuating pins in the event of adjustment of the closing travels of the two valves 9, 10 by means of two nuts 58, 59 being screwed onto their ends.

The spring retainer 32 presents an axial extension 33 which is provided with an external thread and screwed into a threaded bore in the primary piston 3. This provision affords an exact adjustment of the restoring force which is exerted by the return spring 19.

Figure 4:
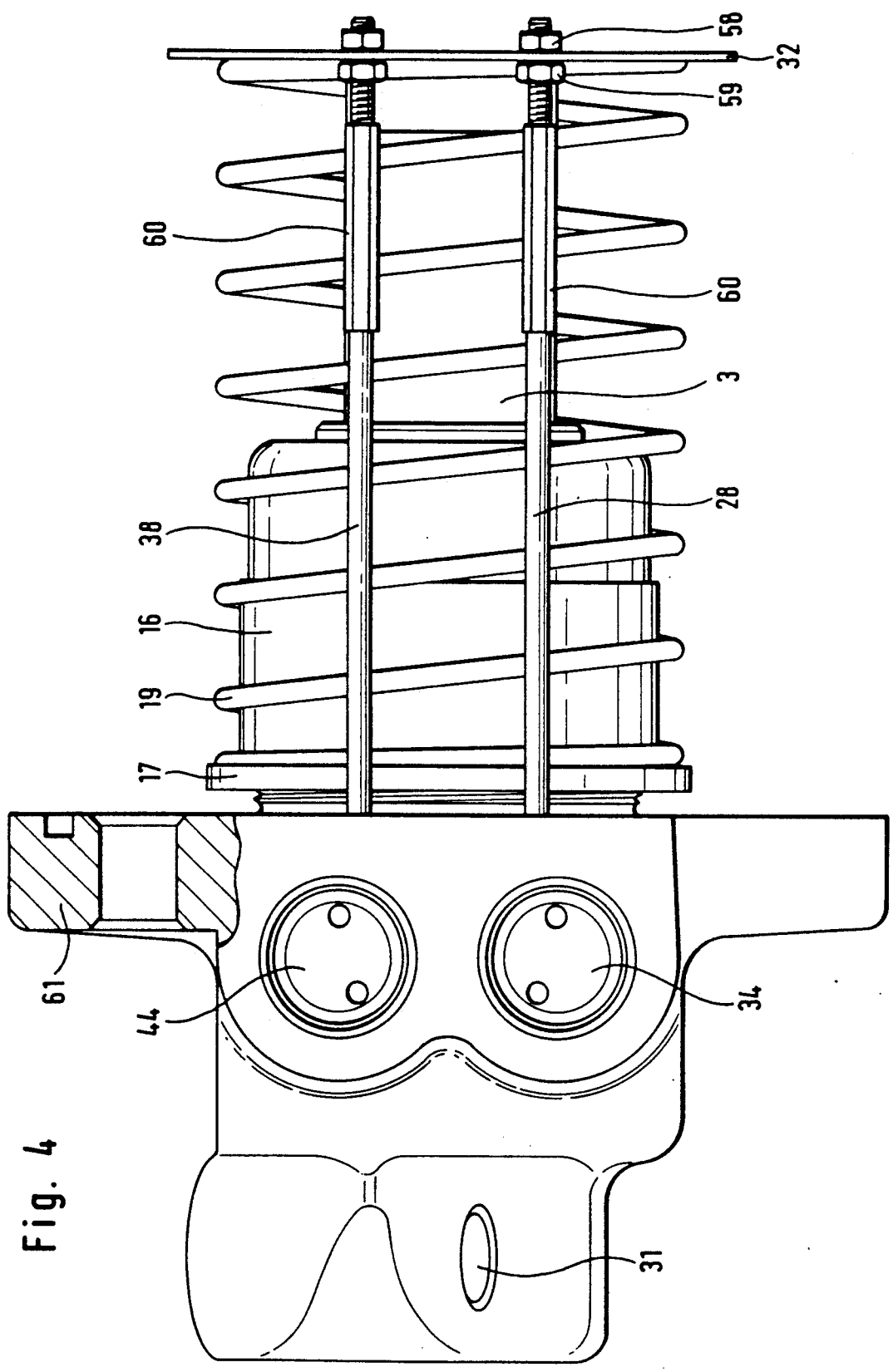
FIG. 4 shows a top view of the FIG. 1 embodiment of the present invention.
Figure 5:
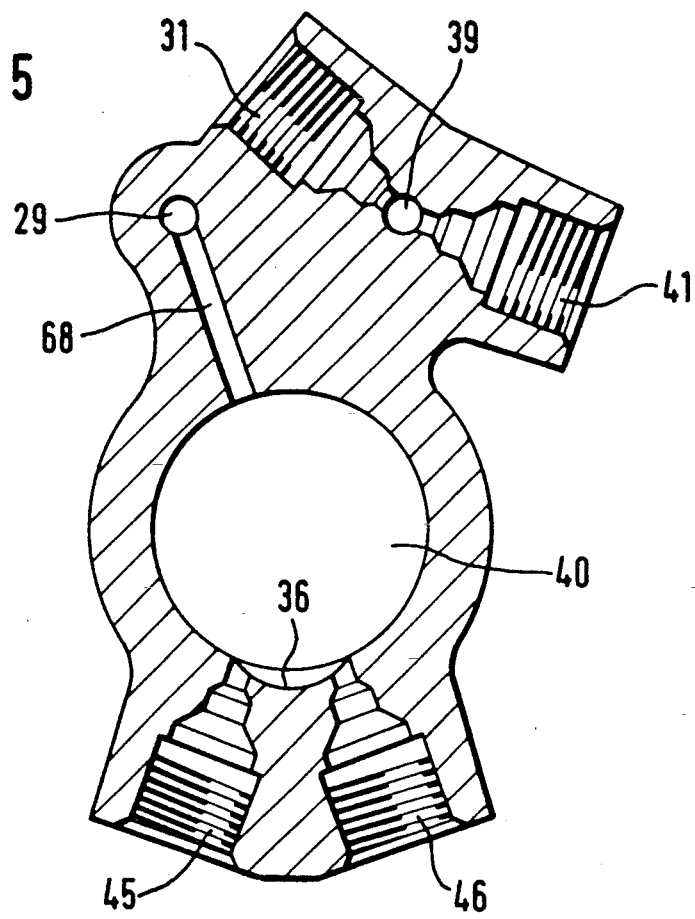
FIG. 5 shows the cross section along the line A—A in FIG. 1.
Figure 6:
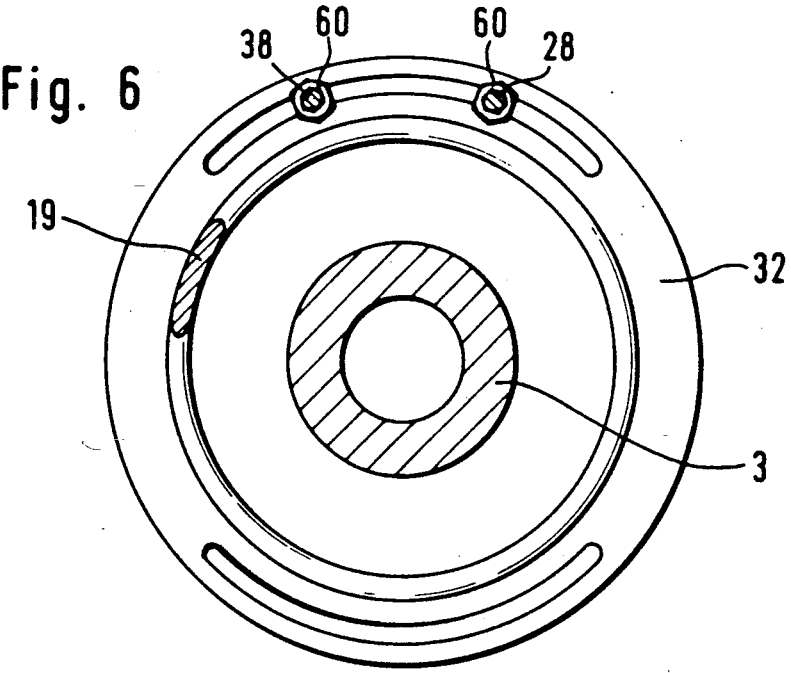
FIG. 6 shows the cross section along the line B—B in FIG. 1.
Figure 7:
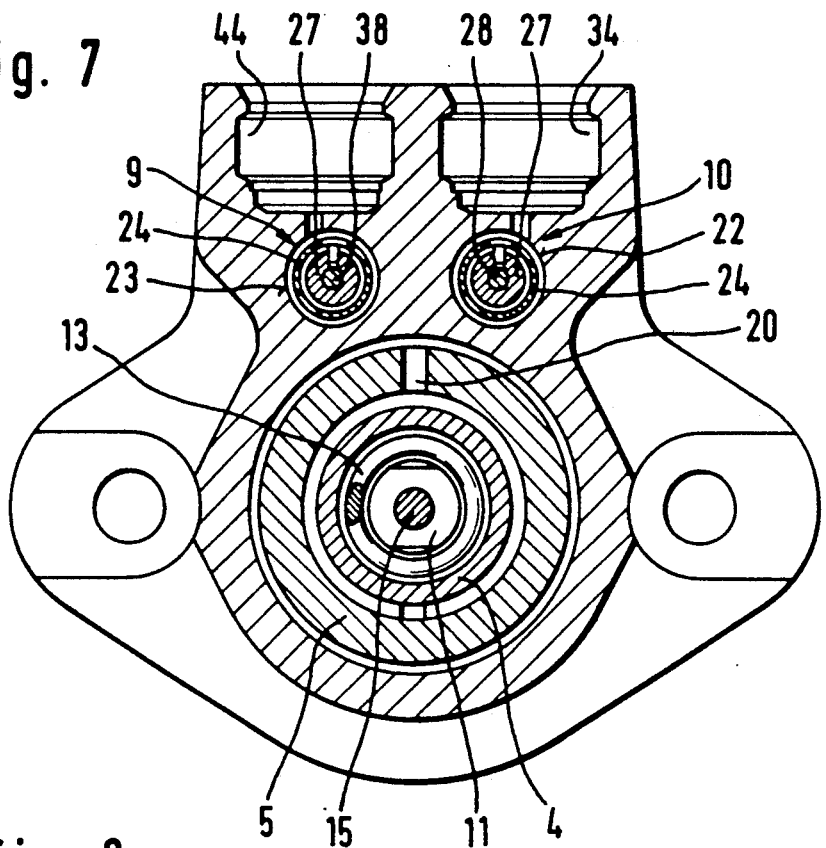
FIG. 7 shows the cross section along the line C—C in FIG. 1.

As is, finally, revealed in particular by FIG. 4, the housing 1 is furnished with a radial flange 61 which renders it possible to fix it to a booster housing 18 of a brake power booster which is not shown in the drawings. Fixation is preferably carried out with the aid of means of fixation, for example, by means of fixing pins 54 (FIG. 2) being coupled to the booster housing 18.

Figure 2:
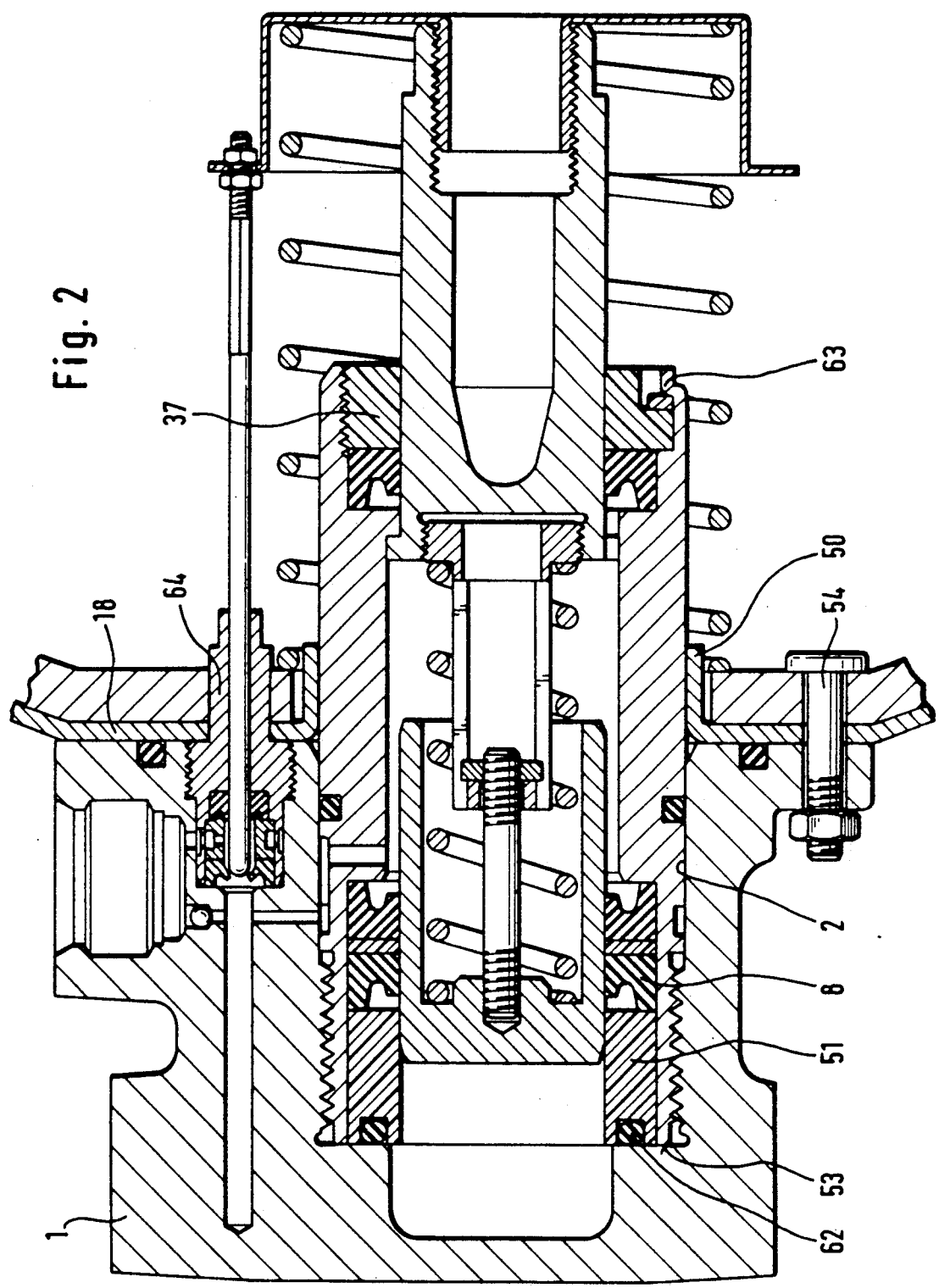
FIG. 2 shows a second embodiment of the present invention in an axial sectional view.

In the embodiment of the invention illustrated in FIG. 2, the bushing 5 is screwed into the housing 1 in the end region of the longitudinal bore 2 up to the stop 53 which is configured in the housing 1. The secondary piston 4 is guided in a guide ring 51 which is pushed into the bushing 5 and is in abutment against the third sealing cup 8, on one side, and against the annular surface forming the stop 53, on the other side. The guide ring 51 is provided at its front face with a sealing ring 62 interacting with the annular surface in order to achieve an unobjectionable separation of the secondary pressure chamber 40 from the primary pressure chamber 30. Guidance of the tandem master cylinder within the booster housing 18 is provided by an axial collar 50 in the region of fixation at the booster housing 18. Axial collar 50 has an internal diameter corresponding roughly to the external diameter of the bushing 5. The guide bushing 37, which has been mentioned in connection with the first embodiment, may either be screwed into the bushing 5 (see upper portion of guide bushing 37) or else be axially retained in the bushing 5 by an inwardly directed offset 63. In this embodiment, the screw-in valve assemblies 24 are formed with axial guide projections 64 which extend through matching openings in the booster housing 18 and which contribute to the exact positioning of the tandem master cylinder in respect of the booster.

Figure 3:
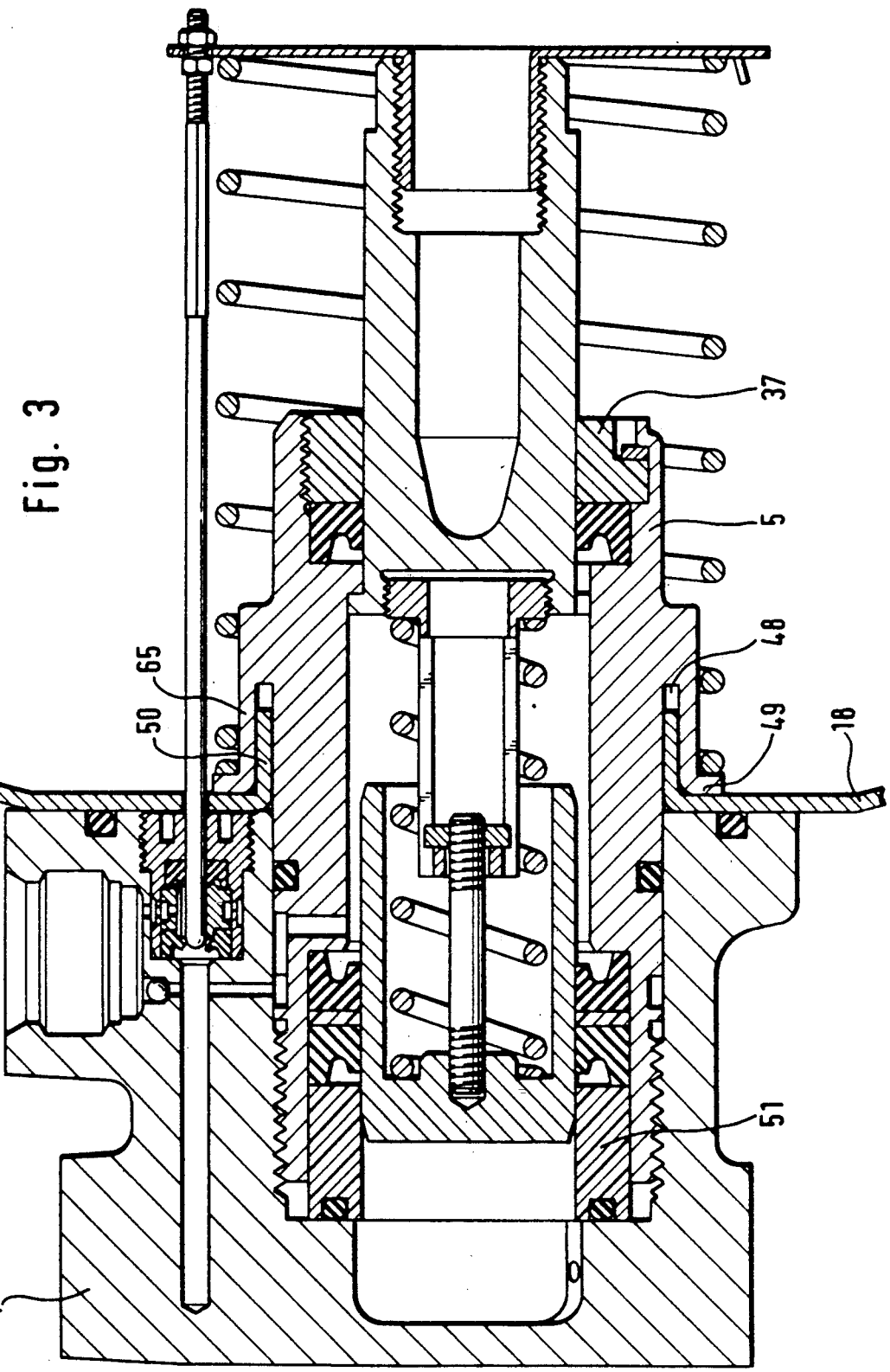
FIG. 3 shows a third embodiment of the present invention in an axial sectional view.

In the embodiment of the invention shown in FIG. 3, the bushing 5 which is screwed into the housing 1 is furnished, in the region of fixation of the booster housing 18, with a circumferential recess 48 whose width corresponds approximately to the material thickness of the collar 50 which is molded to the booster housing 18. The recess 48 is bounded in the outward direction by a collet 65 which is configured to be integral with the bushing 5 and which has a radial annular flange 49 serving as a supporting surface for the return spring 19, on one side, and to fasten the tandem master cylinder to the booster housing 18, on the other side.

Figure 8:
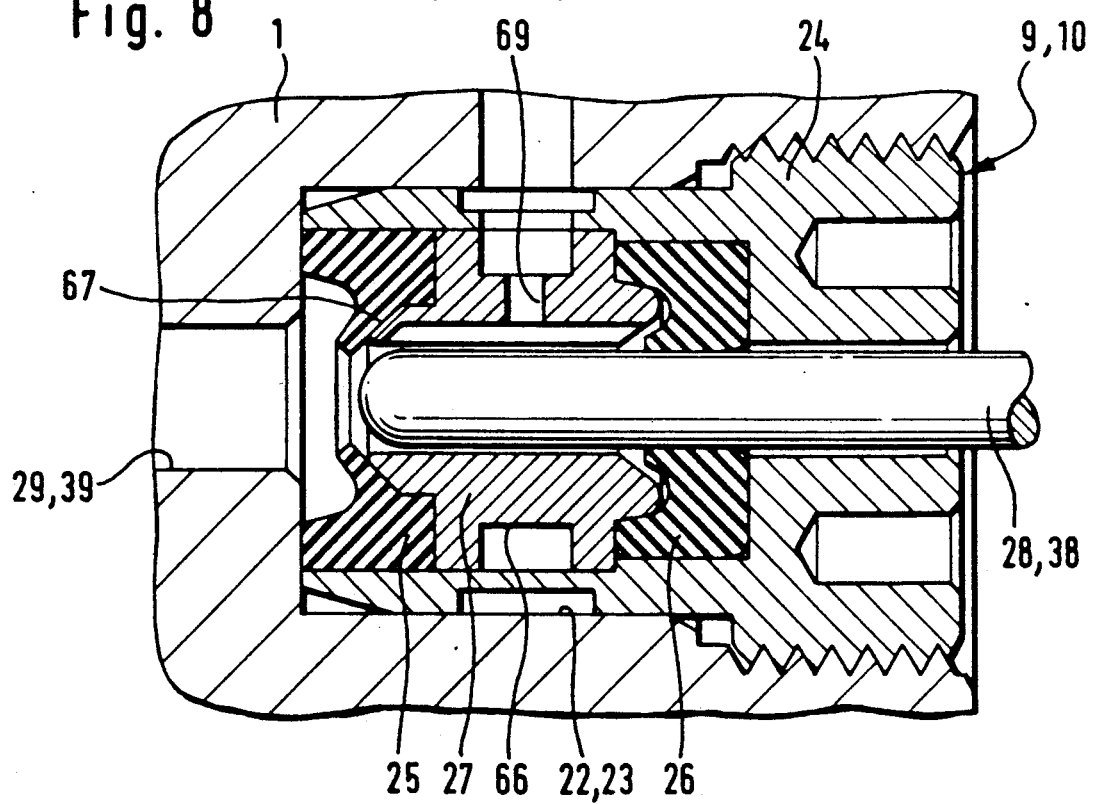
FIG. 8 shows, on an enlarged scale, an axial sectional view of a valve used in the present invention.

It will be seen from the enlarged sectional representation of the valves 9, 10 in FIG. 8 that the intermediate element 27 which is interposed between the two valve cups 25 and 26 is furnished with a radial circumferential recess 66 whose bottom is provided with a bore 69 which permits the hydraulic fluid to flow through it to the first valve cup 25. In order to prevent an undesired deformation of the first valve cup 25 in the event of hydraulic pressure building up in the primary pressure chamber 30, the intermediate element 27 is formed in its region facing the valve cup 25 with a conical supporting surface 67 on which rests the sealing lip of the valve cup 25.

The invention claimed is:

1. A tandem master cylinder for hydraulic brake systems, said cylinder comprising:
    a housing having a closed end longitudinal bore and adapted for attachment to a booster housing of a brake power booster;
    a primary plunger piston within said longitudinal bore and movable along said longitudinal bore;
    a secondary plunger piston within said longitudinal bore and movable along said longitudinal bore, the space between said primary plunger piston and said secondary plunger piston defining a primary pressure chamber and the space between said secondary plunger piston and the closed end of said longitudinal bore defining a secondary pressure chamber;
    means for coupling said primary and said secondary plunger pistons together;
    a return spring urging said primary plunger piston away from said housing;
    a cylindrical bushing within said longitudinal bore and radially outward of said primary and said secondary plunger pistons;
    a first sealing cup sealing said primary pressure chamber from the atmosphere;
    second and third sealing cups fitted between said cylindrical bushing and said secondary plunger piston sealing said primary pressure chamber from said secondary pressure chamber;
    first and second fluid passage means extending through said housing for conducting hydraulic fluid to said primary and said secondary pressure chambers, respectively;
    means for connecting said first and said second fluid passage means to a hydraulic fluid supply tank;
    and first and second valves respectively positioned within said first and said second fluid passage means and responsive independently of each other to movement of said primary plunger piston to control flow of hydraulic fluid to said primary and said secondary pressure chambers, said first and said second valves each having a component which projects to outside said housing and which is accessible outside said housing to adjust the closing travel of the associated valve.

2. A tandem master cylinder according to claim 1 wherein said coupling means include an adjustment sleeve connected to said primary plunger piston and a stop unit connected to said secondary plunger piston and with which said adjustment sleeve is engaged.

3. A tandem master cylinder according to claim 2 wherein said adjustment sleeve is screwed into said primary plunger piston and said cylinder further includes a compression spring supported between said adjustment sleeve and said secondary plunger piston.

4. A tandem master cylinder according to claim 2 wherein said stop unit includes a pin fastened to said secondary plunger piston at a first end of said pin and a disc attached to a second end of said pin and axially adjustable along said pin.

5. A tandem master cylinder according to claim 1 further including a clamping sleeve screwed onto said housing and retaining said cylindrical bushing within said longitudinal bore.

6. A tandem master cylinder according to claim 5 wherein said clamping sleeve has a radially extending annular surface which supports a first end of said return spring.

7. A tandem master cylinder according to claim 1 wherein said cylindrical bushing has a radial bore extending between said primary pressure chamber and said first fluid passage means.

8. A tandem master cylinder according to claim 1 further including stop means for limiting movement of said primary plunger piston relative to said cylindrical bushing.

9. A tandem master cylinder according to claim 8 wherein said stop means include a circlip fitted within a wall of said cylindrical bushing and against which said primary plunger piston abuts.

10. A tandem master cylinder according to claim 9 wherein said primary plunger piston has a radially extending flange having an outside diameter equal to the inside diameter of said cylindrical bushing and said primary plunger piston abuts against said circlip.

11. A tandem master cylinder according to claim 10 wherein said flange has a plurality of circumferential grooves.

12. A tandem master cylinder according to claim 1 wherein said connecting means include tank connections disposed such that a line connecting the centers of said tank connections is at an angle to the axis of said longitudinal bore.

13. A tandem master cylinder according to claim 12 wherein said line connecting said centers of said tank connections is at a right angle to the axis of said longitudinal bore.

14. A tandem master cylinder according to claim 1 wherein movement of said primary plunger piston is guided in said cylindrical bushing and movement of said secondary plunger piston is guided in a reduced-diameter section of said longitudinal bore.

15. A tandem master cylinder according to claim 14 wherein said reduced-diameter section of said longitudinal bore has a circular segment-shaped contour in its inside surface.

16. A tandem master cylinder according to claim 15 wherein said housing has a pair of hydraulic fluid discharge branches at least one of which extends between said circular segment-shaped contour and an outside surface of said housing.

17. A tandem master cylinder according to claim 15 wherein said housing has a pair of hydraulic fluid discharge branches extending between said circular segment-shaped contour and an outside surface of said housing and the axes of said pair of hydraulic fluid discharge branches are disposed at an angle less than 180 degrees.

18. A tandem master cylinder according to claim 1 further including a guide bushing fitted within said cylindrical bushing and wherein:
 (a) movement of said primary plunger piston is guided by said guide bushing, and
 (b) said first sealing cup is positioned against said guide bushing.

19. A tandem master cylinder according to claim 18 wherein said cylindrical bushing has a radially inwardly directed offset which retains said guide bushing within said cylindrical bushing.

20. A tandem master cylinder according to claim 18 wherein said guide bushing is screwed into said cylindrical bushing.

21. A tandem master cylinder according to claim 18 further including a clamping sleeve screwed onto said housing and retaining said guide bushing.

22. A tandem master cylinder according to claim 1 further including a first sealing ring fitted within a circumferential groove in said longitudinal bore and a second sealing ring fitted within a circumferential groove in the outside surface of said cylindrical bushing.

23. A tandem master cylinder according to claim 1 further including a reinforcement disc positioned between said second and said third sealing cups.

24. A tandem master cylinder according to claim 1 wherein said cylindrical bushing is adapted to extend through an axial collar of said brake power booster housing.

25. A tandem master cylinder for hydraulic brake systems, said cylinder comprising:
 a housing adapted for attachment to a booster housing of a brake power booster and having a closed end longitudinal bore and first and second valve bores extending parallel to said longitudinal bore;
 a primary plunger piston within said longitudinal bore and movable along said longitudinal bore;
 a secondary plunger piston within said longitudinal bore and movable along said longitudinal bore, the space between said primary plunger piston and said secondary plunger piston defining a primary pressure chamber and the space between said secondary plunger piston and the closed end of said longitudinal bore defining a secondary pressure chamber;
 means for coupling said primary and said secondary plunger pistons together;
 a return spring urging said primary plunger piston away from said housing;
 a cylindrical bushing within said longitudinal bore and radially outward of said primary and said secondary plunger pistons;
 a first sealing cup sealing said primary pressure chamber from the atmosphere;
 second and third sealing cups fitted between said cylindrical bushing and said secondary plunger piston sealing said primary pressure chamber from said secondary pressure chamber;
 first and second fluid passage means extending through said housing for conducting hydraulic fluid to said primary and said secondary pressure chambers, respectively;
 means for connecting said first and said second fluid passage means to a hydraulic fluid supply tank;
 and first and second valves respectively positioned within said first and said second fluid passage means and within said first and second valve bores of said housing and responsive independently of each other to movement of said primary plunger piston to control flow of hydraulic fluid to said primary and said secondary pressure chambers.

26. A tandem master cylinder according to claim 25 wherein each of said first and said second valves is a screw-in valve assembly and includes a first valve cup, a second valve cup, an intermediate element disposed between said first and said second valve cups, and a valve closing member having a hemispherically configured end of an actuating pin which engages said first valve cup, said actuating pin extending through and guided by said screw-in valve assembly.

27. A tandem master cylinder according to claim 26 wherein said housing has axial extensions of said first and said second valve bores each of smaller diameter than said valve bores and within which said valve actuating pins move, one of said axial extensions leading to said primary pressure chamber and one of said axial extensions leading to said secondary pressure chamber.

28. A tandem master cylinder according to claim 27 wherein said housing has a first hydraulic fluid branch extending between said axial extension leading to said primary pressure chamber and an outside surface of said housing.

29. A tandem master cylinder according to claim 27 wherein said housing has a pair of hydraulic fluid discharge branches opening into said axial extension leading to said primary pressure chamber and the axes of said pair of hydraulic fluid discharge branches are disposed at an angle no greater than 180 degrees.

30. A tandem master cylinder according to claim 26 further including a spring retainer coupled to said primary plunger piston and wherein:
 (a) said return spring is supported by said spring retainer, and
 (b) said valve actuating pins are adjustably coupled to said spring retainer.

31. A tandem master cylinder according to claim 30 wherein said spring retainer has an axial extension fixed to said primary plunger piston.

32. A tandem master cylinder according to claim 26 wherein said intermediate element has a conical support surface which supports a sealing lip of said first valve cup.

33. A tandem master cylinder according to claim 26 wherein each of said screw-in valve assemblies has an axial guide projection extending out of said housing and through which one of said actuating pins extend.

34. A tandem master cylinder for hydraulic brake systems, said cylinder comprising:
- a housing having a closed end longitudinal bore and adapted for attachment to a booster housing of a brake power booster;
- a primary plunger piston within said longitudinal bore and movable along said longitudinal bore;
- a secondary plunger piston within said longitudinal bore and movable along said longitudinal bore, the space between said primary plunger piston and said secondary plunger piston defining a primary pressure chamber and the space between said secondary plunger piston and the closed end of said longitudinal bore defining a secondary pressure chamber;
- means for coupling said primary and said secondary plunger pistons together;
- a return spring urging said primary plunger piston away from said housing;
- a cylindrical bushing within said longitudinal bore and radially outward of said primary and said secondary plunger pistons, said cylindrical bushing:
  - (a) screwed into said housing and
  - (b) having:
    - (i) a circumferential recess adapted to receive an axial collar of said brake power booster housing, and
    - (ii) a radial annular flange adapted to engage said booster housing in an axial direction on one side and supporting said return spring on a second side;
- a first sealing cup sealing said primary pressure chamber from the atmosphere;
- second and third sealing cups fitted between said cylindrical bushing and said secondary plunger piston sealing said primary pressure chamber from said secondary pressure chamber;
- first and second fluid passage means extending through said housing for conducting hydraulic fluid to said primary and said secondary pressure chambers, respectively;
- means for connecting said first and said second fluid passage means to a hydraulic fluid supply tank;
- and first and second valves respectively positioned within said first and said second fluid passage means and within said first and second valve bores of said housing and responsive independently of each other to movement of said primary plunger piston to control flow of hydraulic fluid to said primary and said secondary pressure chambers.

35. A tandem master cylinder according to claim 34 further including a guide ring positioned between the closed end of said longitudinal bore and one of said second and third sealing cups.

36. A tandem master cylinder for hydraulic brake systems, said cylinder comprising:
- a housing having a closed end longitudinal bore with an axial stop, said housing adapted for attachment to a booster housing of a brake power booster;
- a primary plunger piston within said longitudinal bore and movable along said longitudinal bore;
- a secondary plunger piston within said longitudinal bore and movable along said longitudinal bore, the space between said primary plunger piston and said secondary plunger piston defining a primary pressure chamber and the space between said secondary plunger piston and the closed end of said longitudinal bore defining a secondary pressure chamber;
- means for coupling said primary and said secondary plunger pistons together;
- a return spring urging said primary plunger piston away from said housing;
- a cylindrical bushing within said longitudinal bore abutting said axial stop of said longitudinal bore and radially outward of said primary and said secondary plunger pistons, said cylindrical bushing screwed into said housing;
- a first sealing cup sealing said primary pressure chamber from the atmosphere;
- second and third sealing cups fitted between said cylindrical bushing and said secondary plunger piston sealing said primary pressure chamber from said secondary pressure chamber;
- first and second fluid passage means extending through said housing for conducting hydraulic fluid to said primary and said secondary pressure chambers, respectively;
- means for connecting said first and said second fluid passage means to a hydraulic fluid supply tank;
- and first and second valves respectively positioned within said first and said second fluid passage means and within said first and second valve bores of said housing and responsive independently of each other to movement of said primary plunger piston to control flow of hydraulic fluid to said primary and said secondary pressure chambers.

37. A tandem master cylinder according to claim 36 further including means for fastening said housing to said brake power booster housing.

* * * * *